Oct. 27, 1925.                                                            1,558,646
W. THALHOFER
METHOD OF PROTECTING FROM INCRUSTATIONS METALLIC SURFACES
WHICH ARE IN CONTACT WITH WATER OR OTHER LIQUIDS
Original Filed Oct. 25, 1922
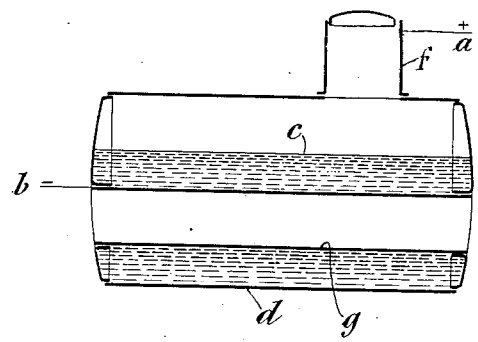
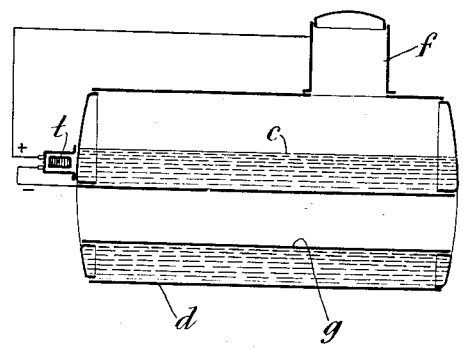

Patented Oct. 27, 1925.

1,558,646

UNITED STATES PATENT OFFICE.

WALTER THALHOFER, OF VIENNA, AUSTRIA, ASSIGNOR TO A. G. FÜR CHEMISCHE INDUSTRIE IN LIECHENSTEIN.

METHOD OF PROTECTING FROM INCRUSTATION METALLIC SURFACES WHICH ARE IN CONTACT WITH WATER OR OTHER LIQUIDS.

Application filed October 25, 1922, Serial No. 596,774. Renewed February 2, 1925.

*To all whom it may concern:*

Be it known that I, WALTER THALHOFER, residing at Vienna, Austria, have invented certain new and useful Improvements in Methods of Protecting from Incrustations Metallic Surfaces Which Are in Contact with Water or Other Liquids, of which the following is a specification.

For the electrical method of protection of boilers against the deposit of a coat of fur (scale) it has been generally suggested to provide for an electrolysis of the water contained in the boiler, and to load the boiler-shell with negative electricity, whereas a positive electrode is, either insulated from and introduced into the interior of the boiler, or into the feed-water inlet. Thereat the positive electrode is consumed proportionally to the current which passes through, and this occurs as well in the case where the electrode is mounted within the boiler as when the electrode is arranged in the feed-water inlet, and in both cases a constant supervision and an often renewal is required in order to prevent a non-working of the protecting arrangement, which is a heavy drawback of the method. Various other methods of preventing the formation of scale have been proposed, but none of them, so far as I know, have proposed utilizing very small currents, such as those of the order of magnitude generated by small thermo couples, the applied voltage of which at the boiler is below that necessary for the decomposition of the contained water; and connecting both poles of the source of such current to the boiler metal. I believe that heretofore where current has been applied to boilers and the like for prevention of scale, either by applying the current from an external source or by the placing of zinc bars within the boiler, the underlying theory has been that of so-called galvanic action or decomposition of the electrolyte—i. e., using an applied voltage at the boiler sufficient to decompose the water. Now, such systems, while workable and effective for preventing the formation of scale, have very serious drawbacks and dangers, among which I may point out the consumption of the positive electrode, whatever it may be, and an unnecessary consumption of current; and in any event, engineers are loath to use on boilers, voltages and currents of such magnitude as in any way to endanger the metal of the boilers, and I believe that these factors have heretofore prevented previously suggested systems from going into general use or from going into any use except in installations where the user can afford to have the system most carefully watched.

According to my invention I provide, with the object of protecting boilers against the deposit of fur (scales), an electric voltage of the current applied to the boiler, which is below the voltage that is necessary for the decomposition of the boiler water or other contained liquid as the case may be. That is to say, an electric current which is so small that the difference of potential between any two points on the boiler cannot be great enough to cause decomposition of the boiler water or other contained liquid, and I apply this small current by connecting both poles of the source directly to the boiler shell or connected metallic parts. For this purpose any suitable source of current may be used, preferably a thermoelectric battery. Such a source of current if heated from the boiler practically assures a dependable or permanent flow of current when the boiler is in operation.

In the drawings the general arrangement for carrying through the method of protection is diagrammatically shown by way of example. Figs. 1 and 2 show the longitudinal sections through a boiler provided with the electric fur-protection.

My method of protecting boilers against the formation of fur (scale) consists therein that I provide and maintain at the boiler, a voltage of the current passing through the boiler metal below the voltage which would be necessary for the decomposition of the boiler water or other contained liquid as the case may be, and inasmuch as boiler water varies considerably in composition, it is important to use an applied voltage at the boiler far below that which decomposes water—i. e., far below 1.4 volts. Thereby the consumption of the electrode on the boiler, and also the disadvantages derived therefrom are practically prevented and the consumption of current is reduced to a minimum.

As shown in Figure 1 the current-conductors can be simply attached at different points of the boiler-walls, for example one line ($a_1$) is connected with the boiler and the other ($b_1$) is carried to the ground, and if necessary a resistance may be arranged in the path of the current, the circuit being closed by the ground. It is of course practically of no importance in which branch of the current-path the boiler is situated. There may be used either an immovable source of current like a storage-battery or a moving electric generator.

A very efficient way of carrying the electric protective method into practise was found in the use of a thermo-electric source of electric energy, because thereby the installation of the protective means is highly simplified and the results are satisfactory in all respects.

The thermo-electric battery can be excited in any suitable manner, either by a special source of heat, for instance an incandescant lamp, or by the boiler itself, that is to say by the heat from the boiler. Fig. 2 shows the thermo-electric battery ($t$), which is mounted on the boiler ($d$). One pole is connected with one part of the boiler such as the steam dome ($f$), the other pole being connected with a part of the boiler remote from this point. For instance, at the neighbourhood of the flame-tube ($g$).

In this way it is possible to carry on the electric method of protecting the boiler, without the use of any foreign source of power and without any moving parts, and the effect is obtained without running expenses.

While in the specification I have referred particularly to boilers, I do so by way of illustration and wish it understood that the invention is applicable not only to water boilers but to related apparatus used for handling boiler water, such as condensers, evaporators and the like, and to other containers of liquids susceptible to the formation of what is known as scale or incrustations.

While I have described my invention by way of illustration in connection with certain preferred embodiments thereof, it will be understood by those skilled in the art, after understanding my invention, that changes and modifications may be made in the apparatus for carrying out the invention without departing from the spirit or scope of my invention, and I aim in the appended claims to cover all such modifications as come within the scope of the invention.

What I claim as new and desire to secure by Letters Patent, is:—

1. The method of protecting from incrustations metal surfaces in contact with liquids, which comprises connecting both poles of a source of current to the metal of the metallic object to be protected or to connected metallic parts, at spaced points to get a distributed flow of current through the metal of said object and causing an electric current to flow through the metal of said object of a magnitude less than that sufficient to produce a drop of potential across said object high enough to decompose the contained liquid.

2. Method of protecting from incrustations metal surfaces in contact with liquids, which comprises connecting both poles of a source of current to the metal of the metallic object to be protected or to connected metallic parts, at spaced points to get a distributed flow of current through the metal of said object and causing an electric current to flow through the metal of said object having an applied voltage at the connected points far below that necessary to decompose water.

3. Method of protecting from incrustations metal surfaces in contact with liquids, which comprises connecting both poles of a thermo electric source of current to the metal of the metallic object to be protected or to connected metallic parts, at spaced points of said object to get a distributed flow of current through the metal of said object and causing electric current to flow through the metal of said object having an applied voltage at said object far below that necessary to decompose water.

4. Method of protecting from incrustations water boilers, which comprises connecting both poles of a source of current to the boiler or connected metallic parts at spaced portions of the boiler to get a distributed flow of current through the boiler metal and causing an electric current to flow through said boiler metal which current is of the order of magnitude of currents generated by small thermo electric couples.

5. Method of protecting from incrustations metal surfaces in contact with liquids, which comprises connecting both poles of a source of current to the metal of the metallic object to be protected or to connected metallic parts, at spaced points to get a distributed flow of current through the metal of said object and causing an electric current to flow through the metal of said object of a magnitude less than that sufficient to produce a drop of potential across said object high enough to decompose water.

6. Method of protecting from incrustations metal containers for heated liquids, which comprises connecting both poles of a source of current external of the container to the container or connected metallic parts at spaced portions of said container to get a distributed flow of current through the metal of said container and causing electric current to flow through said container metal having an applied voltage at the connected points below that necessary to decompose the contained liquid.

In testimony whereof I affix my signature.

ING. WALTER THALHOFER.